UNITED STATES PATENT OFFICE.

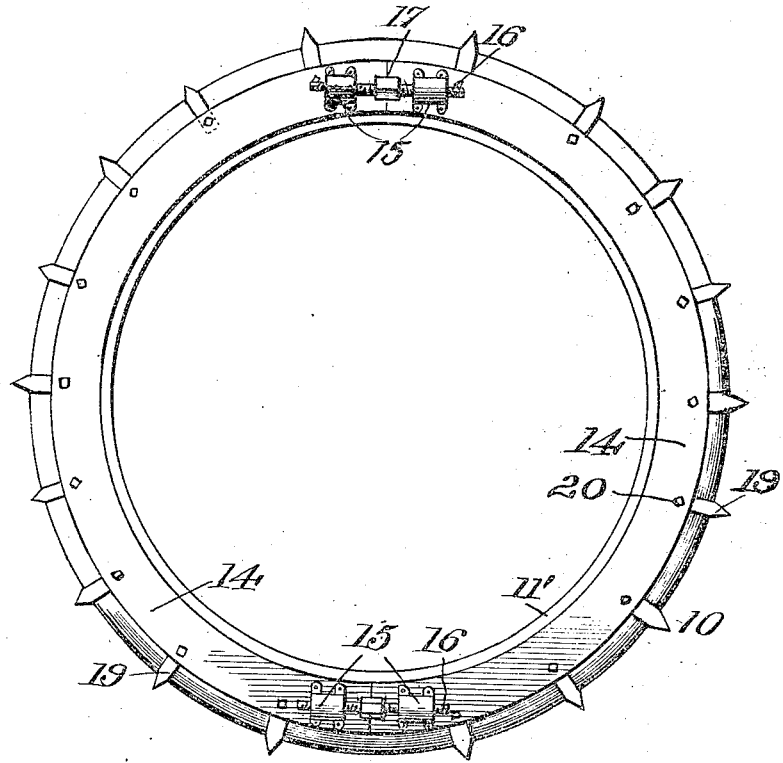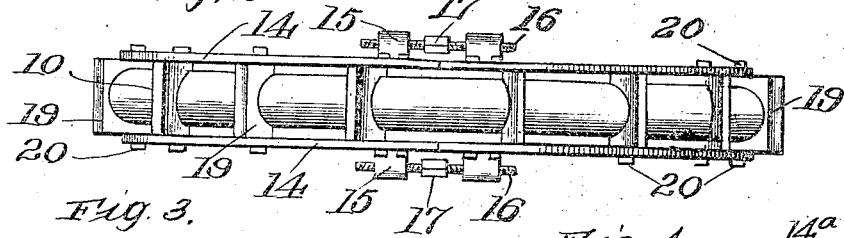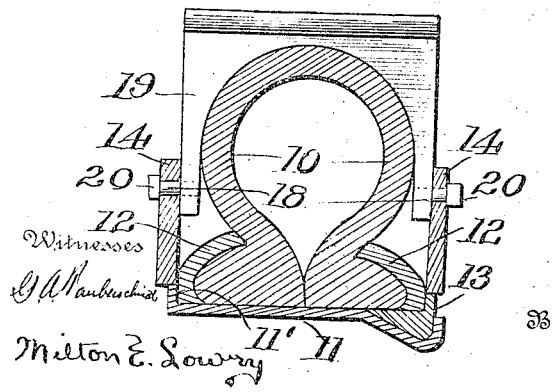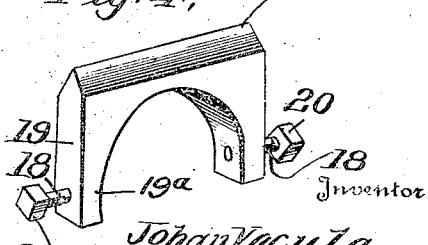

JOHAN VACULA, OF MUNHALL, PENNSYLVANIA.

TRACTION ATTACHMENT FOR VEHICLE-WHEELS.

1,117,280.  Specification of Letters Patent.  Patented Nov. 17, 1914.

Application filed January 29, 1914. Serial No. 815,212.

*To all whom it may concern:*

Be it known that I, JOHAN VACULA, a subject of the Emperor of Austria-Hungary, residing at Munhall, in the county of Allegheny and State of Pennsylvania, have invented certain new and useful Improvements in Traction Attachments for Vehicle-Wheels, of which the following is a specification.

This invention relates to certain new and useful improvements in traction attachments for vehicle wheels.

An object of the invention is to provide a traction device especially designed for attachment to pneumatic tires of automobiles to insure a positive grip while passing on muddy and sandy roads.

With the above and other objects in view that will appear as the nature of the invention is better understood, the same consists in the novel construction, combination, and arrangement of parts to be hereinafter more fully described and then claimed, reference being had to the accompanying drawing by like characters throughout the several views, and wherein :—

Figure 1 is a side elevational view of a pneumatic tire, provided with an attachment embodying my invention. Fig. 2 is an edge plan view of the same. Fig. 3 is an enlarged cross-sectional view, and Fig. 4 is an enlarged perspective view of the road-engaging block.

Referring more particularly to the drawing accompanying this application, the reference numeral 10 indicates a pneumatic tire of the usual construction to be received on the rim section 11, the said tire being retained thereon by removable rings 12 and locking band 13. The device as shown is applied to a tire of the pneumatic type, but is readily adaptable to solid tires or other forms of wheels.

Disposed at each side of the wheel is a pair of semi-circular plates 14 that are slightly spaced at their meeting ends. Each end of the plates 14 is provided with a lug 15 which may be formed integral therewith or secured thereto in any suitable manner as shown. A bolt 16 that is oppositely threaded at each end and provided midway thereof with a turning nut 17 is received by the lugs 15 for the purpose of tightening the side plates 14.

The side plates 14 are provided with equidistantly spaced openings through which pass the threaded bolts 18 for securing to said plates the road-engaging blocks 19. The bolts 18 are headed as at 20, the heads engaging the plates 14 to limit the inward movement thereof. The inner face of the block 19 which rests on the tire 10 is hollowed out to provide a curvature similar to the outer face of the said tire and strain upon the tire is therefore evenly distributed. This hollowing out of the block provides embracing arms 19ª which are secured between the plates 14 and the outer sides of the tire, and the outer end 14ª of the block is oppositely beveled to form a sharp edge to engage the road surface.

When the several parts are assembled, the inner edges of the plates 14 rest on the flange 11ˣ of the rim 11 and the locking band 13, which relieves the strain on the tire 10. In tightening the plates 14 by the bolts 16, the road-engaging blocks 14 are brought into closer relation with the tire 10, and a substantially rigid structure will result.

It will be seen from the above description and operation of the device that I have provided a traction attachment for wheels of any type which may be easily and quickly mounted thereon and removed therefrom, this removability permitting the tire to travel resiliently on hard roads.

What I claim is :—

The combination with a wheel tire, rim, and locking band, said rim and band having annular outwardly projecting flanges, of segmental plates arranged one at each side of the tire and having inner flat faces and secured on the upstanding flanges of said rim and locking band to afford a rigid radial support for said plates and formed with bolt holes, adjusting means for said plates, traction blocks each beveled at its outer edge and hollowed out at its inner side to fit the tire and to provide inwardly extending arms embracing the tire, said arms extending inward between said plates and the outer sides of the tire and having flat outer surfaces abutting the inner flat faces of said plates and provided with openings registering with the openings in the plates, and bolts extending through said openings.

In testimony whereof I affix my signature in presence of two witnesses.

JOHAN VACULA.

Witnesses:
　JULIUS EGECCZKY,
　KASPAR YURCA.